(12) United States Patent
Tschaggeny et al.

(10) Patent No.: US 8,016,254 B2
(45) Date of Patent: Sep. 13, 2011

(54) PIEZOELECTRIC ACTUATED GIMBAL

(75) Inventors: Charles W. Tschaggeny, Woods Cross, UT (US); Warren F. Jones, Idaho Falls, ID (US); Eberhard Bamberg, Salt Lake City, UT (US)

(73) Assignee: Battelle Energy Alliance, LLC, Idaho FAlls, ID (US)

( * ) Notice: Subject to any disclaimer, the term of this patent is extended or adjusted under 35 U.S.C. 154(b) by 833 days.

(21) Appl. No.: 12/061,256

(22) Filed: Apr. 2, 2008

(65) Prior Publication Data

US 2009/0249900 A1  Oct. 8, 2009

(51) Int. Cl.
*F16M 11/02* (2006.01)

(52) U.S. Cl. .................. 248/178.1; 248/278.1

(58) Field of Classification Search .......... 248/178.1, 248/278.1, 279.1, 282.1, 184.1, 274.1, 637, 248/660; 74/5.7

See application file for complete search history.

(56) References Cited

U.S. PATENT DOCUMENTS

| 4,270,393 | A | * | 6/1981 | Osborne et al. | 74/5 F |
| 5,383,645 | A | * | 1/1995 | Pedut et al. | 248/637 |
| 6,286,386 | B1 | * | 9/2001 | Spletzer et al. | 74/490.01 |
| 6,308,791 | B1 | * | 10/2001 | Spletzer et al. | 180/8.1 |
| 6,536,724 | B2 | * | 3/2003 | Furuta | 248/183.2 |
| 7,561,784 | B2 | * | 7/2009 | Wescott et al. | 396/13 |
| 7,871,033 | B2 | * | 1/2011 | Karem et al. | 244/7 A |
| 2004/0079839 | A1 | * | 4/2004 | Bath et al. | 244/131 |
| 2004/0173726 | A1 | * | 9/2004 | Mercadal et al. | 248/660 |
| 2009/0183951 | A1 | * | 7/2009 | Fiala et al. | 185/27 |
| 2009/0266948 | A1 | * | 10/2009 | Hanlon et al. | 248/201 |

* cited by examiner

*Primary Examiner* — Ramon Ramirez
(74) *Attorney, Agent, or Firm* — Wells St. John

(57) ABSTRACT

A gimbal is described and which includes a fixed base member defining an axis of rotation; a second member concentrically oriented relative to the axis of rotation; a linear actuator oriented in immediate, adjoining force transmitting relation relative to the base member or to the second member, and which applies force along a linear axis which is tangential to the axis of rotation so as to cause the second member to rotate coaxially relative to the fixed base member; and an object of interest mounted to the second member such that the object of interest is selectively moved relative to the base member about the axis of rotation.

31 Claims, 5 Drawing Sheets

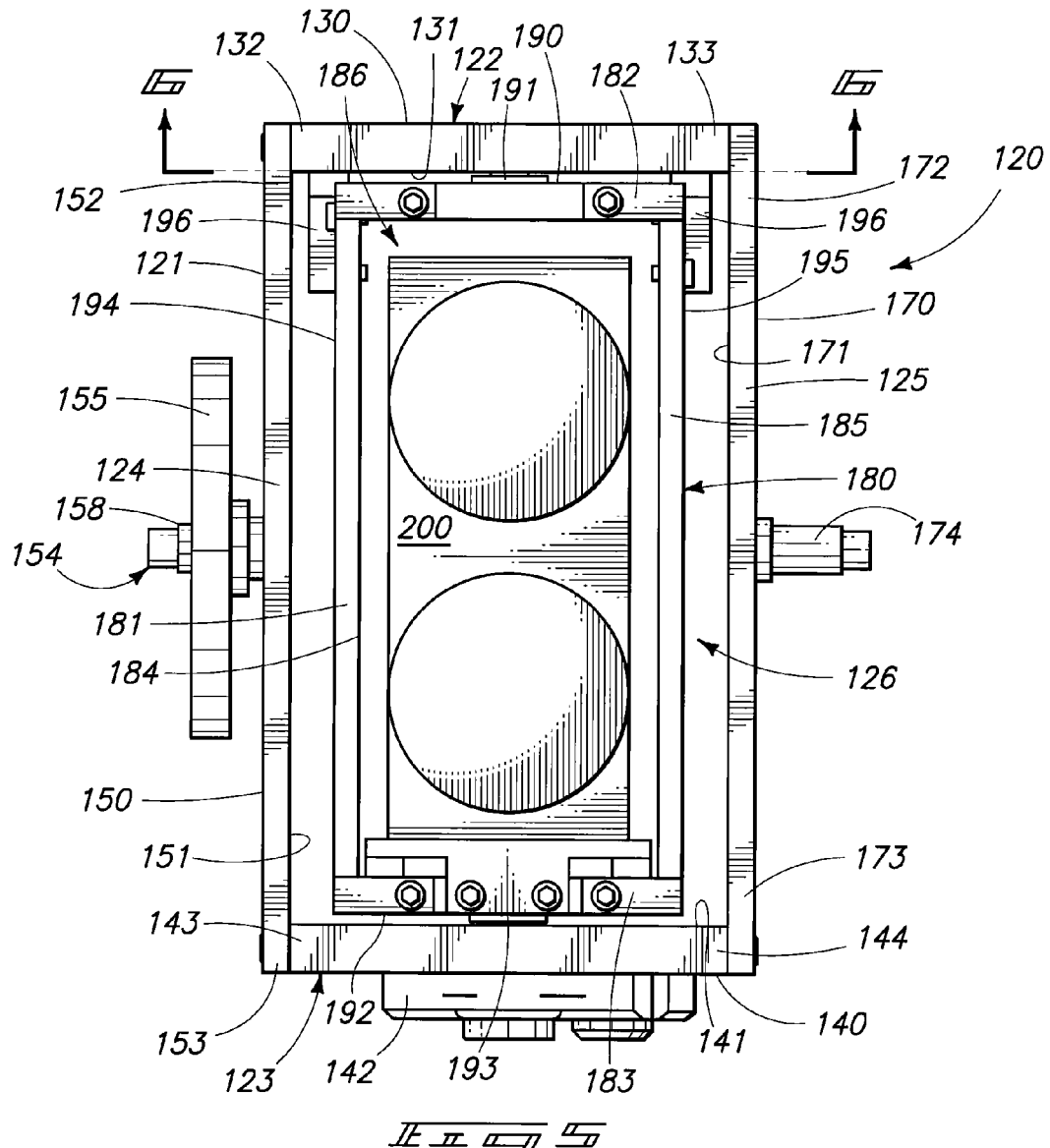
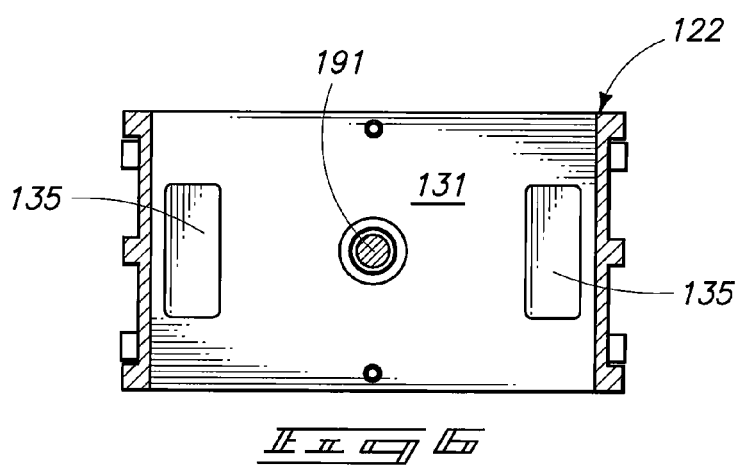

PIEZOELECTRIC ACTUATED GIMBAL

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

The present invention relates to a gimbal, and more specifically to a piezoelectric actuated gimbal that provides sub micro-meter movement for orienting an instrument or an object of interest in up to three axes of rotation.

BACKGROUND OF THE INVENTION

The use and application of small, autonomous, unmanned aerial vehicles (UAVs) has increased dramatically in the past few years due to an increased need for low-cost surveillance in high-risk areas. UAVs have been found to be useful in border security, battlefield surveillance, emergency response, and other similar applications. UAVs are capable of fully autonomous flight, except during landing, when manual piloting is required. Because these aircraft are flying near the lower limit of their performance envelope during landing maneuvers, this is when most UAV accidents occur. Automated landing devices which would tend to reduce UAV accidents during landings have traditionally required heavy and bulky on-board systems and mechanisms. One possible alternative to a traditional on-board automated landing system for UAVs is a ground-based system that consists of an on-board range finder that communicates with a ground-based device near the landing zone. The range finder in such an arrangement is mounted on the UAV by means of a gimbal and is directed toward the ground-based device. Alternatively, the gimbal-mounted range founder can be mounted on the ground and scan the sky for the UAV. The position of the UAV would then be determined from the gimbal orientation angles and other data generated by the range finder. This data could then provide the type of highly accurate position information required for autonomous landings of a UAV.

While such a system has been seriously considered by UAV designers, it has not been developed because of rather serious shortcomings in the art relative to a gimbal which could perform in the manner necessary to make this system operational. A principal reason that this ground based system has been, heretofore, developed is that no available gimbal technology provided the highly accurate, high speed, sub-micrometer movement in three axes that is required for such a system. Traditional gimbals use conventional electrical motors, such as direct current stepper motors, which do not have the accuracy, speed, and sub-micrometer movement required for this, and other applications, such as pin-point photography, ground position sensing, and targeting, which is needed in UAV applications. Furthermore, existing gimbals do not have the light weight, three axis range of motion, or instrument payload characteristics required for most UAV applications.

A new gimbal, which avoids the shortcomings attendant with the prior art devices and practices utilized heretofore, is the subject matter of the present application.

SUMMARY OF THE INVENTION

A first aspect of the present invention relates to a gimbal which includes a fixed base member defining an axis of rotation; a second member concentrically oriented relative to the axis of rotation; a linear actuator oriented in immediate, adjoining force transmitting relation relative to the base member or to the second member, and which applies force along a linear axis which is tangential to the axis of rotation so as to cause the second member to rotate coaxially relative to the fixed base member; and an object of interest mounted to the second member such that the object of interest is selectively moved relative to the base member about the axis of rotation.

Another aspect of the present invention relates to a gimbal which includes a fixed base member having a predetermined axis; a rotatable member mounted in concentric and substantially coaxial alignment relative to the predetermined axis; a linear piezoelectric actuator mounted in driving relation relative to either the fixed base member or the rotatable member, and which, when energized, imparts rotational movement to the rotatable member about the predetermined axis relative to the fixed base; and an object of interest mounted on the rotatable member such that the object of interest is moved relative to the fixed base member about the predetermined axis.

Another aspect of the present invention relates to a gimbal which includes a fixed base member having a predetermined common point through which three predefined axes of rotation intersect, and wherein the three axes of rotation are oriented in substantially orthogonal relation one relative to the others; three rotatable members mounted in individual concentric relation relative to each of the three axes of rotation; three groups of one or more linear piezoelectric actuators which, when selectively energized, causes the respective rotatable members to selectively rotate about the respective axes of rotation; a mounting member fixedly mounted to each rotatable member; and an object of interest borne by one of the mounting members, and which is moved relative to the base member and selectively about the three axes of rotation.

Yet another aspect of the present invention relates to a gimbal which includes a base member fixedly attached to a moving object, and wherein a pitch axis of rotation, a roll axis of rotation, and a tilt axis of rotation are oriented in orthogonal relation, one relative to the others, and which intersect at a common point relative to the base member; three rotatable shafts borne by the base member and which are individually located along each of the respective pitch, roll, and tilt axes of rotation; three rotatable members, each being individually mounted and disposed in concentric relationship relative to the respective three rotatable shafts; three linear piezoelectric actuators individually drivingly coupling the base member to the respective rotatable members, and which, when selectively energized, imparts a substantially tangential driving force to the respective rotatable members to cause the respective rotatable members and the respective rotatable shafts to selectively rotate about the respective axes of rotation; and an instrument mounting member fixedly mounted on at least one of the three rotatable members such that an instrument mounted on the mounting member is moved relative to the base member about the three axes of rotation.

These and other aspects of the present invention will be described in greater detail hereinafter.

BRIEF DESCRIPTION OF THE DRAWINGS

Preferred embodiments of the invention are described below with reference to the following accompanying drawings.

FIG. 5 is a fragmentary, side elevation view of a portion of the subject invention.

FIG. 6 is a bottom plan view of a portion of the apparatus of the subject invention taken from a position along line 6-6 of FIG. 5.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
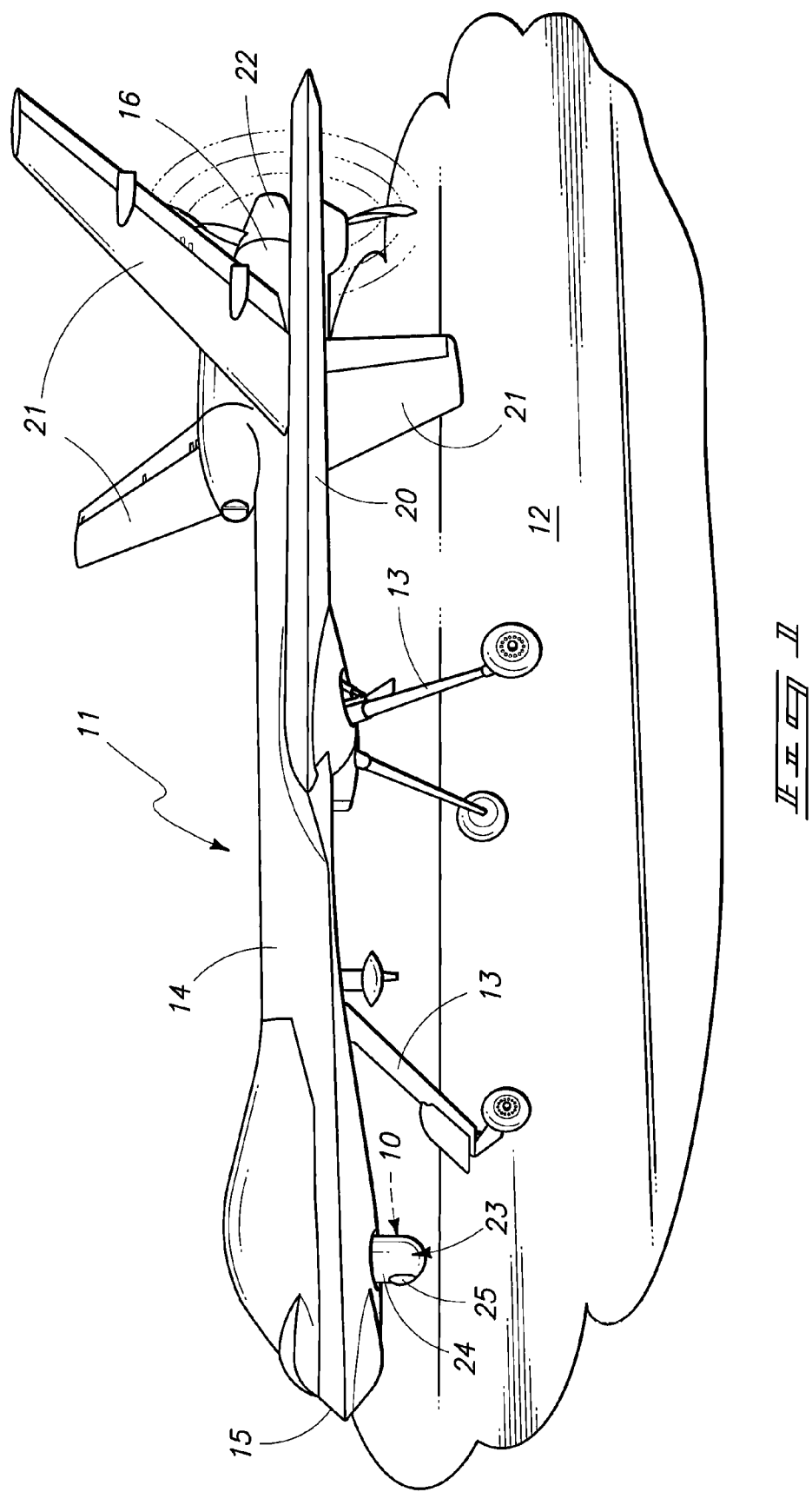
FIG. 1 is a depiction of a unmanned aerial vehicle which utilizes the subject matter of the present invention.

The gimbal apparatus of the present invention is generally indicated by the numeral 10 in FIGS. 1 and following. As seen in FIG. 1, the apparatus 10 of the present invention finds usefulness in many environments, including where it is mounted for use on an unmanned aerial vehicle which is generally indicated by the numeral 11. As seen in FIG. 1, the unmanned aerial vehicle 11 is of conventional design. It is depicted in FIG. 1 as being supported on the surface of the earth 12, as it would be if it was being readied for flight. As seen in FIG. 1, the unmanned aerial vehicle 11 has a landing gear 13 which supports the unmanned aerial vehicle 11 for earth traversing movement, and which further allows it to be launched and recovered onto the surface of the earth or the deck of a ship, for example. The landing gear supports a fuselage 14 in predetermined spaced relation relative to the surface of the earth 12. The fuselage has a forward end 15, and an opposite rearward end 16. The fuselage supports a pair of wings 20 (only one of which is shown). Still further, the rearward end 16 of the fuselage 14 includes a plurality of control surfaces or empennage 21 which are useful for controlling the direction of movement of the unmanned aerial vehicle once it is launched. As seen in FIG. 1, the unmanned aerial vehicle includes an engine 22 of conventional design which provides propulsion for the unmanned aerial vehicle 11. As shown in the drawings, and specifically in FIG. 1, the unmanned aerial vehicle carries a sensor housing 23, which is mounted near the forward end 15 of the fuselage 14. The sensor housing is defined by a sidewall 24. The sidewall further defines an aperture or window 25 which allows a sensor such as a laser range finder, camera, or other payload enclosed within the sensor housing to view therethrough so that the unmanned aerial vehicle 11, for example, can communicate or provide data to a ground-based device, or can be used for imaging the underlying surface of the earth when it is deployed on reconnaissance or other missions. For purposes of the present invention, the present unmanned aerial vehicle 11 will be hereinafter referred to as a moving object throughout the remainder of the specification.

Figure 2:
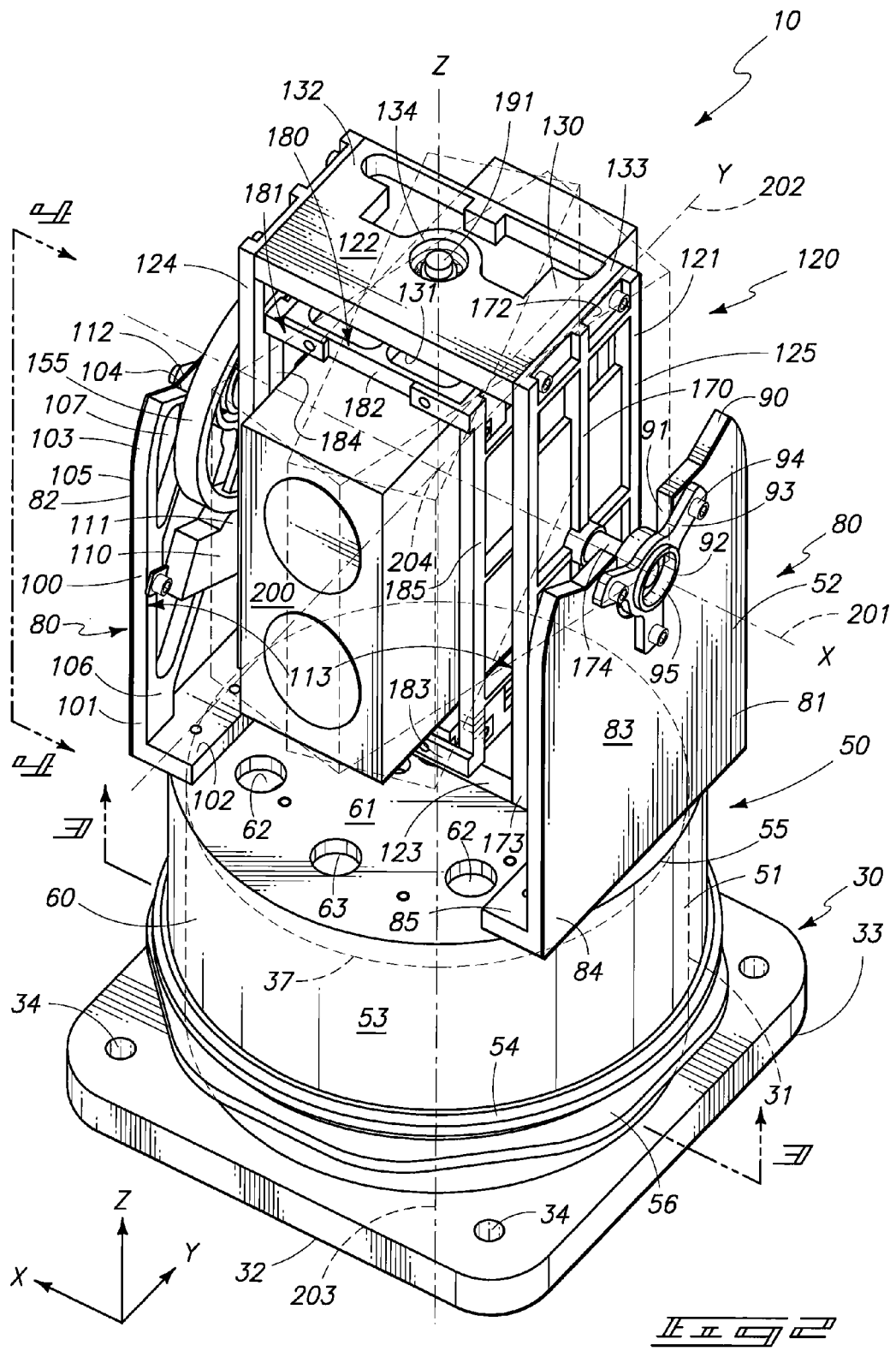
FIG. 2 is a perspective, side elevation view of the subject invention.
Figure 3:
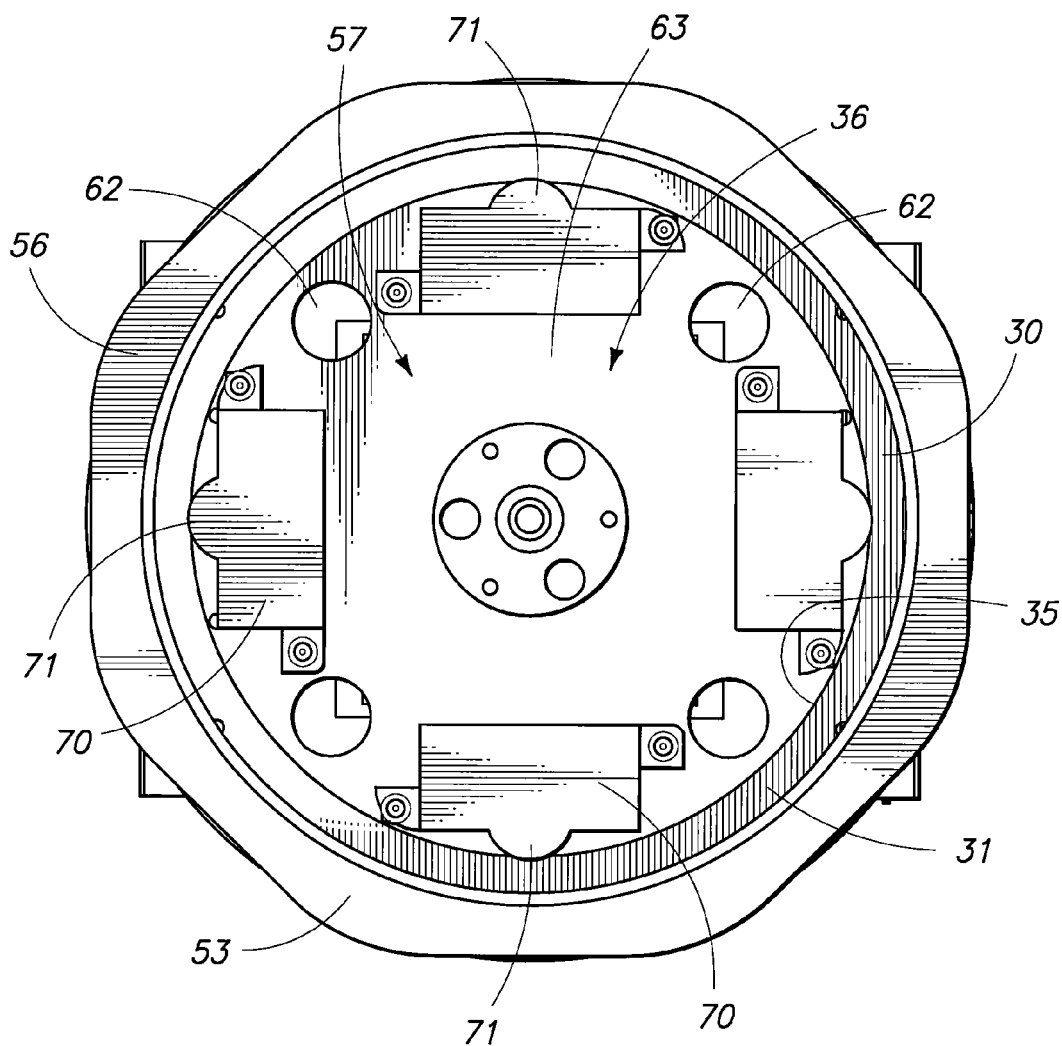
FIG. 3 is a bottom, plan view of the present invention taken from a position along line 3-3 of FIG. 2.

Referring now to FIG. 2, it should be understood that the apparatus 10 of the present invention is enclosed within the sensor housing 23 that is mounted on the moving object or unmanned aerial vehicle 11. The apparatus 10 is useful to orient a payload or other sensor device, which will be discussed in greater detail, hereinafter, in an appropriate orientation so that the payload may be able to communicate with a ground-based device or to view through the aperture or window 25 appropriate regions of the surface of the earth 12 as the unmanned aerial vehicle 11 moves about on assorted missions. In the present arrangement, the apparatus 10 includes, as seen in FIGS. 2 and 3, a base member which is generally indicated by the numeral 30. The base member has a main body 31 which has a first end 32, which defines a peripheral flange 33. The peripheral flange 33 has a plurality of apertures 34 formed therein and which are operable to receive suitable fasteners (not shown). The fasteners are operable to fixedly engage the fuselage 14 of the moving object 11 so as to attach it in an appropriate orientation within the sensor housing 23.

Referring still to FIG. 2, it will be seen that the main body 31 of the base member 30 is generally cylindrically shaped and extends outwardly and upwardly from the peripheral flange 33. Referring now to FIG. 3, it will be seen that the main body 31 of the base member 30 has an interior facing sidewall generally indicated by the numeral 35. The interior facing sidewall defines an internal cavity 36. Moreover, as seen in FIG. 2, the main body has a second end 37. As will be appreciated by a study of FIG. 2, the main body 31 constitutes a shaft around which other assemblies will rotate, and which will be discussed hereinafter. Further, in connection with the present invention 10, it should be understood that at least a portion of the surface constituting the interior sidewall 35 may be fabricated, at least in part, from a ceramic material. Further, the material that is provided for or otherwise coated onto the surface of the interior sidewall 35 may be of a material with sufficient hardness so as to provide a suitable surface upon which a piezoelectric motor may operate.

Referring still to FIGS. 2 and 3, a first rotatable member which is generally indicated by the numeral 50, is mounted for predetermined rotational movement relative to the fixed base member 30. The first rotatable member 50 is defined by a first portion 51 which is mounted in substantially coaxial rotatable movement relative to the main body 31 of the base member 30, and a second portion 52, which is mounted on the first portion 51, and which extends upwardly relative thereto and which will be described in greater detail hereinafter. The first portion 51 includes a main body 53 which is generally cylindrically shaped, and which has a first end 54 and an opposite second end 55. As seen by reference to FIG. 2, a circumscribing flange 56 extends radially outwardly thereabout the first end 54. Still further, and as seen by reference to FIGS. 2 and 3, the main body 53 defines an interior cavity 57 which has a diametral dimension which is greater than the outside diametral dimension of the main body 31 of the base member 30 so that the main body 31 can be received in a substantially telescoping relationship internally of the cavity 57. As seen in FIG. 2, the main body 53 has an outside facing, curved, peripheral sidewall 60 which supports a top outside facing surface 61. A plurality of apertures 62 extend through the top outside facing surface 61 to the top inside facing surface 63 (FIG. 3). As illustrated in FIG. 3, at least one or a group or plurality of linear actuators 70, typically piezoelectric motors of conventional design, are mounted on the top inside facing surface 63 of the main body 53 of the first portion 51. The piezoelectric motors 70 include a reciprocally moveable driving member 71 which, when energized, forcibly engages the inside facing surface 35 and thus imparts rotational movement to the first rotatable member 50 about a predetermined axis relative to the fixed base member 30. These several axes of rotation will be discussed in greater detail hereinafter. One skilled in the art will appreciate that, in an alternative configuration, the piezoelectric motors could be mounted on the main body 31 of the base member 30 and engage the first portion 51 of the first rotatable member 50, and thus impart a similar rotational movement to the first rotatable member 50 about a predetermined axis relative to the fixed base member 30.

Referring now to FIG. 2, the second portion 52 of the first rotatable member 50 includes a pair of support frames which are generally indicated by the numeral 80. As seen therein, the pair of support frames is defined by a first frame 81, and a second frame 82, which are mounted in predetermined substantially parallel spaced relation one relative to the other. As seen in the drawings, the first frame member has a main body 83 which generally extends normally upwardly relative to the top, outside facing surface 61, of the main body 53. The main body 83 has a first or lower end 84 which has a mounting flange 85 attached thereto. The mounting flange 85 is affixed to the top outside facing surface 61 by means of suitable fasteners (not shown). Still further, the first frame member 81 has a second, or upper end 90, which has formed therein a recessed region 91 which is operable to receive, in mating relation therein, a bearing housing 92 of conventional design. The bearing housing 92 includes a plurality of flange members 93 which are operable to be attached to the second or upper end 90 by means of a plurality of fasteners 94. A bearing 95 of conventional design is received within the bearing housing 92 and is operable to rotatably receive a shaft which will be discussed in greater detail hereinafter.

Figure 4:
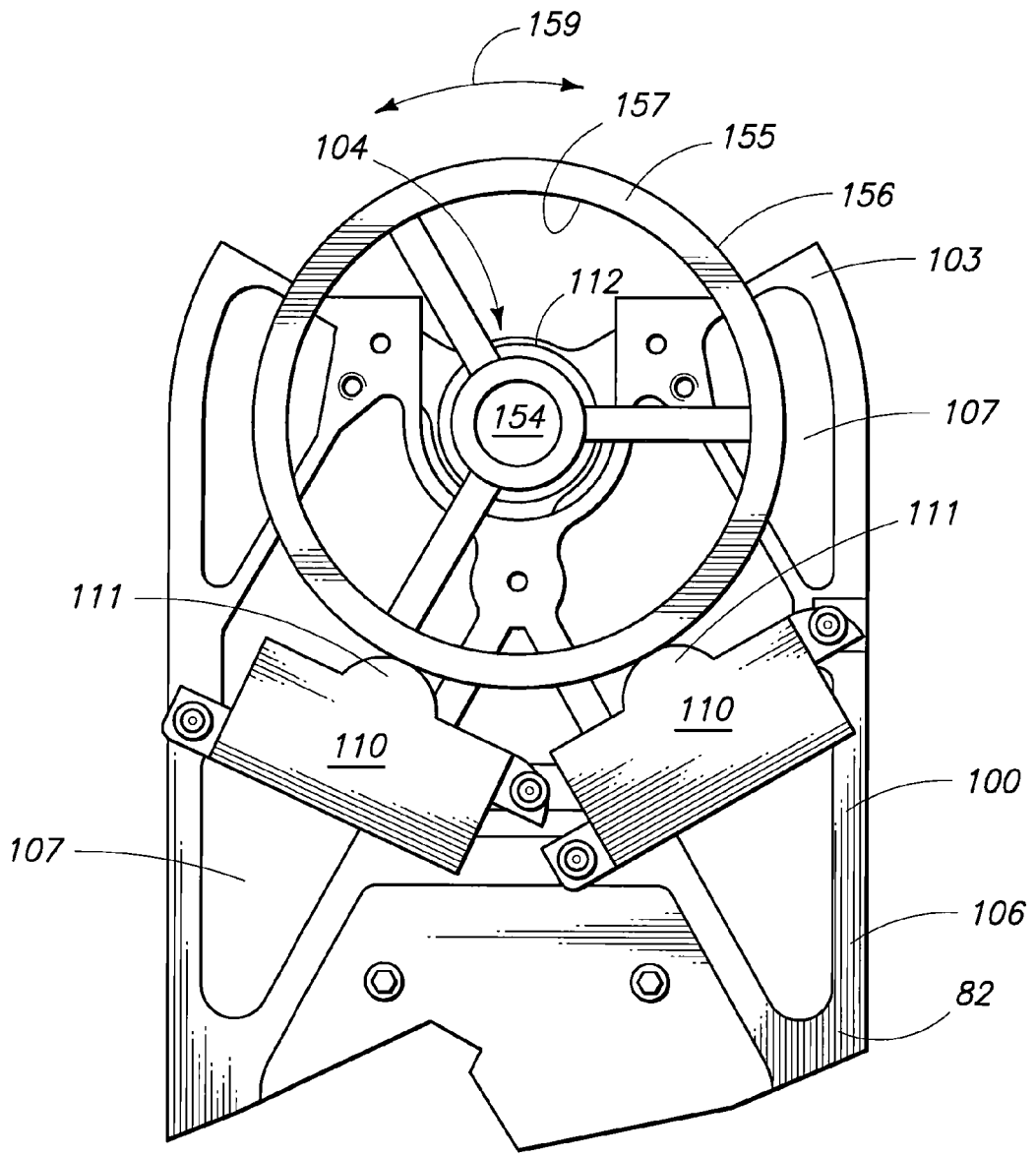
FIG. 4 is a fragmentary, partial, side elevation view taken from a position along line 4-4 of FIG. 2.

Referring now to FIGS. 2 and 4, it will be understood that the first rotatable member 50 includes a second frame member 82 which has a main body 100. Similar to that previously described with respect to the first frame member 81, the main body 100 of the second frame member 82 extends substantially normally upwardly relative to the top outside facing surface 61 of the first portion 51 of the first rotatable member 50. In the arrangement as seen in FIG. 2, the main body 100 has a first or lower end 101. The first or lower end includes a mounting flange 102 which is affixed by suitable fasteners to the top outside facing surface 61. The main body 100 is disposed in predetermined substantially parallel spaced relation relative to the main body 83 of the first frame member 81. As illustrated in FIGS. 2 and 4, the main body 100 further has a second or upper end 103. The upper end 103 defines a recessed region 104. Still further, it should be understood that the main body 100 has an outside facing surface 105 and an opposite inside facing surface 106. As illustrated most clearly by reference to FIG. 4, a plurality of apertures 107 are formed in the main body 100 and extend between the outside and inside facing surfaces 105 and 106, respectively. These apertures decrease the weight of the overall second frame member 82 in view of its potential use in an airborne application. As seen by reference to FIGS. 2 and 4, it will be understood that at least one or a group or plurality of piezoelectric motors 110 are mounted on the inside facing surface 106 in a given orientation so as to engage the rotatable shaft of another assembly which will be described in greater detail hereinafter. The piezoelectric motors 110 are similar in design to the piezoelectric motors 70, that is, they each include individual reciprocally moveable driving members 111 which are operable to impart rotational movement to a shaft which will be described in greater detail below. Still referring to FIG. 4, it will be understood that a bearing housing 112 of conventional design is received in the recessed region 104 as defined by the second or upper end 103. The bearing housing again is affixed to the second or upper end by using suitable fasteners (not shown). The bearing housing includes a bearing (not shown) which is operable to rotatably support a shaft which will be described below. As illustrated most clearly by reference to FIG. 2, it will be seen that a space or region 113 is defined between the first and second frame members 81 and 82, and which will accommodate the rotational movement of a second rotatable member, which will be described in the paragraphs which follows.

As seen most clearly by reference to FIGS. 2, 5, and 6, the apparatus 10 of the present invention includes a second rotatable member 120 which is supported by, and rotates relative to the first and second frame members 81 and 82, respectively. The second rotatable member is defined by a generally rectangular shaped housing 121 which is defined by opposite first and second end walls 122 and 123, respectively; and first and second sidewalls 124 and 125, respectively. As illustrated in these views, it will be seen that the first and second end walls 122 and 123 are fastened to the first and second sidewalls 124 and 125 using suitable fasteners to form a rigid rectangular frame. The first and second end walls, as well as the first and second sidewalls, in combination, define an internal cavity 126 which further accommodates a payload or other moveable sensor frame which will be discussed in greater detail, below. As illustrated in the drawings, the first end wall 122 has a top surface 130, and an opposite bottom or inside facing surface 131 (FIG. 6). The first end wall 122 has a first end 132 which is affixed to the first sidewall 124, and an opposite, second end 133 which is affixed to the second sidewall 125. Additionally, it will be seen from FIG. 2 that a bearing receiving cavity 134 is formed substantially centrally relative to the first end wall 122 and is operable to matingly receive a bearing of conventional design (not shown). As illustrated most clearly by reference to FIG. 6, actuating or engagement surfaces 135 are affixed to the bottom surface 131 of the first end wall 122, and are fabricated from a material with sufficient hardness so as to provide a suitable surface upon which a piezoelectric motor can operate. The material that may be selected for this may include such materials such as assorted ceramics and the like.

As seen most clearly by reference to FIG. 5, the apparatus 10, and more specifically the second end wall 123 has an outside facing surface 140, and an opposite, inside facing surface 141. The second end wall 123 has a first end 143 which is connected to the first sidewall 124, and a second end 144 which is connected to the second sidewall 125 using conventional fasteners. As illustrated in FIG. 5, the first sidewall 124 is defined by outside and inside facing surfaces 150 and 151, respectively. Still further, the first sidewall 124 has a first end 152 and an opposite second end 153 which are attached to the respective first and second end walls 122 and 123, respectively. As seen most clearly by reference to FIG. 5, a first shaft 154 is suitably fastened by welding or other fastening techniques to the outside facing surface 150, and extends normally outwardly relative thereto. This first shaft 154 has a distal end 158 which has mounted thereon a curved actuating surface 155 which may take on the form of a ring, disk, or similar shape such as seen in FIG. 4. The curved actuating surface has an outside peripheral driving surface 156 and an opposite, inside peripheral surface 157. In one possible form of the invention, as seen in FIG. 4, the outside peripheral surface 156 may also constitute a driving surface against which piezoelectric motors 110 may operate. As seen in FIG. 4, it will be appreciated that the driving members 111 of the piezoelectric motors 110 are periodically disposed in driving force engaging tangential relation relative to the outside peripheral edge 156 of the actuating surface 155 so as to impart movement to same. Movement of the outside peripheral edge 156, of course, imparts a corresponding rotational movement to the first shaft 154. Once rotational movement is imparted to the first shaft 154, the first shaft causes the second rotatable member 120 to rotate relative to the first and second frame members 81 and 82, respectively, as best seen by the line labeled 159 in the FIG. 4. As seen further by reference to FIG. 5, it will be understood that the second sidewall 125 is defined by an outside facing surface 170 and an opposite outside facing surface 171. Still further, the second sidewall has a first end 172 which is affixed to the first end wall 122 and an opposite second end 173 which is attached to the second end wall 123. As seen in FIG. 5, a second shaft 174 is provided, and which is affixed by welding or other suitable fastening techniques to the outside surface 170 and extends substantially normally outwardly relative thereto. As will be appreciated, the second shaft 174 is substantially coaxially aligned relative to the first shaft 154 so as to provide an axis of rotation for the second rotatable member 120. The operation of this feature of the invention will be discussed in greater detail below. As should be understood, the second shaft 174 is received within the bearing housing 92 so as to provide suitable rotational movement to effect some of the operational features of the present invention.

Referring still to FIGS. 2 and 5, the present apparatus 10 has a third rotatable member which is generally indicated by the numeral 180. As seen herein, the third rotatable member comprises, at least in part, a payload housing which is indicated by the numeral 181. The payload housing 181 is defined by first and second end walls 182 and 183, respectively, which are disposed in predetermined spaced relation one relative to the other, and first and second sidewalls 184 and 185 which are affixed by suitable fastening techniques to the first and second end walls to thereby provide a rigid rectangular frame which defines an internal cavity 186, which receives a payload of various designs. The payload, which is generally indicated by the numeral 200, as will be described hereinafter, will constitute an object of interest such as, instrument receivers; sensors; weapon systems; target acquisition devices; imaging devices; or other devices which may be used in various vehicles such as the unmanned aerial vehicle 11 which is shown in FIG. 1. As seen in FIG. 2, an encoder 142, of conventional design, is mounted on the outside facing surface 140 of the second wall 123 of the second rotatable member 120, and is operable to monitor the angular position of the third rotatable member 120 relative to the second rotatable member 120, or the base member 30, as earlier described. It will be noted that an additional encoder (not shown) may be mounted on the first rotatable member 50 to monitor the angular position of the second rotatable member 120 relative to the first rotatable member 50 or the base member 30; and an additional encoder (not shown) may be mounted on the base member 30 to monitor the angular position of the first rotatable member 50 relative to the base member 30. The information from the encoder 142 and others (not shown) is transmitted to a ground-based receiver to provide position information for the moving object 11.

Referring now to FIG. 5, the payload housing 181, and more specifically the first end wall 182 has an outside facing surface 190. Extending substantially normally outwardly relative to the outside facing surface is a first shaft 191. The first shaft 191 is matingly received within the bearing receiving cavity 134, shown in FIG. 2, and is rotatable relative thereto. Still further, the second end wall 183 has an outside facing surface 192. Extending substantially normally outwardly relative to the outside facing surface 192 is a second shaft member 193. Again the shaft member 193 is received in a suitable bearing (not shown). It will be understood that the first and second shafts 191 and 193, respectively, are substantially coaxially aligned so as to define an axis of rotation for the payload housing 181. This arrangement allows the payload housing 181 to partially rotate within the cavity 126 along a path of travel which is equal to about +/−15° relative to an axis of rotation which will be described hereinafter, but which is generally defined by the first and second shafts 191 and 193, respectively. This path of travel is best see by the phantom views of the payload 200 as see in FIG. 2. Still further, the first sidewall 184 has an outside facing surface 194, and the second sidewall 185 has an outside facing surface 195. As seen most clearly by reference to FIG. 5, at least one or a group of piezoelectric motors, generally indicated by the numeral 196, are mounted on the outside facing surfaces 194 and 195 of the first and second sidewalls 184 and 185, respectively, and in a region near the first end wall 182 where the first and second sidewalls are affixed. The piezoelectric motors 196 are of conventional design similar to that earlier described, and which have a driving member (not shown). The piezoelectric motors are operable, when energized, to provide a driving force which acts against the actuating surfaces 135 (FIG. 6) which are affixed to the bottom surface 131 of the first end wall 122. As illustrated in FIGS. 2 and 5, a payload or object of interest 200 is received within the cavity 186 as defined by the payload housing 181, and is moveable with payload housing 181.

Referring now to FIG. 2, it will be understood that the present apparatus 10, as shown herein, is selectively movable about a first or X axis, which is sometimes referred to hereinafter as a pitch axis 201; a second or Y axis 202, which is sometimes referred to hereinafter has a tilt axis; and a third or Z axis, which is sometimes referred to hereinafter as a roll axis 203. As should be understood, the present apparatus 10 is selectively moved, or otherwise rotated by means of a controller (not shown) in order to selectively rotate the first, second and third rotatable members 50, 120 and 180, respectively, in appropriate orientations so that the payload or object of interest 200 can be oriented appropriately relative to the unmanned aerial vehicle 11 as it performs maneuvers relative to the surface of the earth 12. The three axes 201, 202 and 203 intersect at a common point 204 relative to the apparatus 10. As seen in FIG. 2, all the axes are in orthogonal relation one relative to the others.

OPERATION

The operation of the described embodiment of the present invention is believed to be readily apparent and is briefly summarized at this point.

In its broadest aspect, a gimbal apparatus 10 of the present invention includes a fixed base member 30 defining an axis of rotation generally indicated by the numeral 203. A second member 50 is concentrically oriented relative to the axis of rotation 23. Still further, a linear actuator 70 is provided and oriented in immediate, adjoining, force transmitting relation relative to the base member 30 or to the second member 50, and which, when energized, applies force along a substantially linear axis which is substantially tangential to the axis of rotation 203 so as to cause the second member 50 to rotate coaxially relative to the fixed base member 30. Still further, in the broadest aspect of the present invention, an object of interest 200 is provided and mounted to the second member 50 such that the object of interest 200 is selectively moved relative to the base member 30 about the axis of rotation 203. As noted above, the piezoelectric motor or linear actuator 70 (FIG. 3) may be mounted on the fixed base member 30 or directly mounted to the second member 50 in an alternative form of the invention (not shown). The piezoelectric motor or linear actuator 70, when energized, causes movement of the driving member 71 along a substantially linear axis in individual incremental distances of less than about 10 micrometers. As noted above, the linear actuator may comprise, in one form of the invention, a linear piezoelectric actuator as earlier described and which has a driving member which is operable to periodically engage an underlying driving surface. As noted earlier in the application, the present apparatus 10 is operable to rotate the payload or object of interest 200 about three axes of rotation which may comprise a roll axis 203, a pitch axis 201, and a tilt axis 202, respectively. As seen most clearly by reference to FIG. 2, the three predetermined axes 201, 202 and 203, respectively are mounted in orthogonal relation, one relative to the others, and these three axes commonly intersect at a common point 204 relative to the fixed base member 30.

Another aspect of the present invention relates to an apparatus 10 which includes a fixed base member 30 having a predetermined axis 203. The apparatus 10 further includes a rotatable member 50 mounted in concentric and substantially coaxial alignment relative to the predetermined axis 203. As seen in FIG. 2, and following, a linear piezoelectric actuator 70 is mounted in driving relation relative to either the fixed base member 30 or the rotatable member 50, and which, when energized, imparts rotational movement to the rotatable member 50 about the predetermined axis 203 relative to the fixed base member 30. As seen in the drawings, an object of interest 200 is mounted on the rotatable member 50 such that the object of interest is moved relative to the fixed base member about the predetermined axis 203. A salient feature of the present invention relates to the use of a linear piezoelectric actuator 70 which imparts a substantially tangential driving force to the rotatable member 50 relative to the predetermined axis 203. As discussed earlier in this application, the rotatable member 50 may be fabricated, at least in part, from a material with sufficient hardness so as to provide the piezoelectric motor 70 with a suitable surface upon which to operate. In one form of the invention, this rotatable member is fabricated, at least in part, from a ceramic material. As seen in the drawings, and in the form of the invention as discussed herein, the fixed base member 30 and the rotatable member 50 are directly drivingly coupled together by the linear piezoelectric actuator 70. As earlier discussed, and in another possible form of the invention, the linear piezoelectric actuator 70 may alternatively be mounted upon the rotatable member 50, and act upon the fixed base member 30. In the form of the invention as seen in the drawings, the rotatable member may comprise, for example, the second rotatable member 120 as seen in the drawings. As earlier discussed relative to that structure, the second rotatable member includes a curved actuating surface 155 which may take on the form of a ring, disk or the like. In the form of the invention as shown in FIG. 4, the curved actuating surface 155 has opposite outside and inside peripheral edges 156 and 157, respectively, and wherein the linear piezoelectric actuator 110 directly drivingly engages either the outside peripheral edge 156 or the inside peripheral edge 157 depending on the form of the invention employed.

A third aspect of the present invention relates to an apparatus 10 which includes a base member 30 which is fixedly attached to a moving object 11, and wherein a pitch axis of rotation 201, a roll axis of rotation 203, and a tilt axis of rotation 202 are oriented in orthogonal relation, one relative to the others, and which intersect at a common point 204 relative to the base member. In this form of the invention, three rotatable shafts comprising, at least in part, the numerals 53, 154, 174, 191 and 193, are borne by the base member 30 and which are individually coaxially oriented along each of the respective pitch, roll, and tilt axes of rotation 201, 203 and 202, respectively. In this form of the invention, three rotatable members 50, 120 and 180 are provided. Each of these rotatable members are individually mounted and disposed in concentric relationship relative to the respective three rotatable shafts. As seen in the drawings, three individual or groups of linear piezoelectric actuators or motors are provided, those being 70, 110 and 196, respectively. The individual piezoelectric motors are individually drivingly coupled to the base member 30 and to the respective rotatable members 50, 120, and 180. In the arrangement as seen in the drawings, when the respective linear piezoelectric actuators are selectively energized, they each impart a substantially tangentially oriented driving force to the respective rotatable members 50, 120 and 180 to cause the respective rotatable members, and the respective rotatable shafts to selectively rotate about the respective axes of rotation 201, 203 and 202. Still further, in this form of the invention, an instrument mounting member or payload housing 181 is provided and which is fixedly mounted to each of the three rotatable members such that an instrument 200 mounted on the mounting member is moved relative to the base member 30 about the three axes of rotation 201, 203 and 202.

Therefore, it will be seen that the present invention provides many advantages over the prior art devices which have not provided the required rapid acceleration, pointing accuracy, or high-speed response necessary to position a receiver, sensor, imaging or other device in an appropriate three-axis orientation so that it may communicate with or otherwise provide data to a ground-based device or image or otherwise view a region of interest such as the surface of the earth when used in various airborne applications.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A gimbal, comprising:
   a fixed base member defining an axis of rotation;
   a second member concentrically oriented relative to the axis of rotation;
   a linear actuator oriented in immediate, adjoining force transmitting relation relative to the base member or to the second member, and which applies force along a linear axis which is tangential to the axis of rotation so as to cause the second member to rotate coaxially relative to the fixed base member; and
   an object of interest mounted to the second member such that the object of interest is selectively moved relative to the base member about the axis of rotation.

2. A gimbal as claimed in claim 1, and wherein the linear actuator is mounted on the fixed base member.

3. A gimbal as claimed in claim 1, and wherein the linear actuator is mounted on the second member.

4. A gimbal as claimed in claim 1, and wherein the linear actuator provides movement along the linear axis in individual incremental distances of less than about 10 micrometers.

5. A gimbal as claimed in claim 1, and wherein the linear actuator is a linear piezoelectric actuator.

6. A gimbal as claimed in claim 1, and wherein the linear actuator is a linear piezoelectric motor.

7. A gimbal as claimed in claim 1, and wherein the axis of rotation is selected from the group consisting of a roll axis, a pitch axis, and a tilt axis.

8. A gimbal as claimed in claim 1, and further comprising three predetermined axes of rotation which are mounted in orthogonal relation, one relative to the others, and which intersect at a common point relative to the fixed base member.

9. A gimbal, comprising:
a fixed base member having a predetermined axis;
a rotatable member mounted in concentric and substantially coaxial alignment relative to the predetermined axis;
a linear piezoelectric actuator mounted in driving relation relative to either the fixed base member or the rotatable member, and which, when energized, imparts rotational movement to the rotatable member about the predetermined axis relative to the fixed base; and
an object of interest mounted on the rotatable member such that the object of interest is moved relative to the fixed base member about the predetermined axis.

10. A gimbal as claimed in claim 9, and wherein the linear piezoelectric actuator imparts a substantially tangential driving force to the rotatable member relative to the predetermined axis.

11. A gimbal as claimed in claim 9, and wherein the predetermined axis is selected from the group consisting of a roll axis, a pitch axis, and a tilt axis.

12. A gimbal as claimed in claim 9, and further comprising three predetermined axes of rotation which are oriented in orthogonal relation, one relative to the others, and which further intersect at a common point relative to the fixed base member.

13. A gimbal as claimed in claim 9, and wherein the rotatable member is fabricated, at least in part, from a material with sufficient hardness so as to provide the piezoelectric motor a suitable surface upon which to operate.

14. A gimbal as claimed in claim 9, and wherein the rotatable member is fabricated, at least in part, from a ceramic material.

15. A gimbal as claimed in claim 9, and wherein the fixed base member and the rotatable member are directly drivingly coupled together by the linear piezoelectric actuator.

16. A gimbal as claimed in claim 15, and wherein the linear piezoelectric actuator is mounted upon the fixed base member.

17. A gimbal as claimed in claim 15, and wherein the linear piezoelectric actuator is mounted upon the rotatable member.

18. A gimbal as claimed in claim 9, and wherein the rotatable member has opposite first and second sides and a curved peripheral edge.

19. A gimbal as claimed in claim 18, and wherein the linear piezoelectric actuator is mounted upon the fixed base member, and directly drivingly engages one of the first or second sides or the peripheral edge of the rotatable member.

20. A gimbal as claimed in claim 18, and wherein the linear piezoelectric actuator is mounted upon one of the first or second sides or the peripheral edge of the rotatable member, and further directly drivingly engages the fixed base member.

21. A gimbal as claimed in claim 9, and wherein the rotatable member has a substantially circular or semi-circular shape with opposite first and second sides, and outside and inside facing surfaces.

22. A gimbal as claimed in claim 21, and wherein the linear piezoelectric actuator is mounted upon the fixed base member and directly drivingly engages either the first or second sides, or the outside or inside facing surfaces of the rotatable member.

23. A gimbal as claimed in claim 21, and wherein the linear piezoelectric actuator is mounted upon either the first or second sides, or the outside or inside facing surfaces of the rotatable member, and is directly drivingly coupled to the fixed base member.

24. A gimbal as claimed in claim 9, and wherein the linear actuator is a linear piezoelectric motor.

25. A gimbal, comprising:
a fixed base member having a predetermined common point through which three predefined axes of rotation intersect, and wherein the three axes of rotation are oriented in substantially orthogonal relation one relative to the others;
three rotatable members mounted in individual concentric relation relative to each of the three axes of rotation;
three groups of linear piezoelectric actuators which, when selectively energized, causes the respective rotatable members to selectively rotate about the respective axes of rotation;
a mounting member fixedly mounted to each rotatable member; and
an object of interest borne by one of the mounting members, and which is moved relative to the base member and selectively about the three axes of rotation.

26. A gimbal as claimed in claim 25, and wherein the three predetermined axes are a roll axis, a pitch axis, and a tilt axis.

27. A gimbal as claimed in claim 26, and wherein the linear piezoelectric actuators impart a tangentially oriented driving force to the respective rotatable members.

28. A gimbal as claimed in claim 27, and wherein at least one of the three linear piezoelectric actuators is mounted on at least one of the rotatable members.

29. A gimbal as claimed in claim 27, and wherein at least one of the three linear piezoelectric actuators is mounted on the fixed base member.

30. A gimbal as claimed in claim 25, and wherein at least one of the rotatable members is fabricated, at least in part, from a ceramic material.

31. A gimbal, comprising:
a base member fixedly attached to a moving object, and wherein a pitch axis of rotation, a roll axis of rotation, and a tilt axis of rotation are oriented in orthogonal relation, one relative to the others, and which intersect at a common point relative to the base member;
three rotatable shafts borne by the base member and which are individually located along each of the respective pitch, roll, and tilt axes of rotation;
three rotatable members, each being individually mounted and disposed in concentric relationship relative to the respective three rotatable shafts;
three linear piezoelectric actuators individually drivingly coupling the base member to the respective rotatable members, and which, when selectively energized, imparts a substantially tangential driving force to the respective rotatable members to cause the respective rotatable members and the respective rotatable shafts to selectively rotate about the respective axes of rotation; and
an instrument mounting member fixedly mounted to at least one of the three rotatable members such that an instrument mounted on the mounting member is moved relative to the base member about the three axes of rotation.

* * * * *